(12) United States Patent
Szilagyi et al.

(10) Patent No.: US 7,653,629 B2
(45) Date of Patent: *Jan. 26, 2010

(54) PRIORITY DIFFERENTIATED SUBTREE LOCKING

(75) Inventors: Zoltan C Szilagyi, Redmond, WA (US); Matthew Paul Rhoten, Seattle, WA (US); Philip Ti-Fei Su, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/683,951

(22) Filed: Mar. 8, 2007

(65) Prior Publication Data
US 2007/0150474 A1    Jun. 28, 2007

Related U.S. Application Data

(63) Continuation of application No. 10/222,953, filed on Aug. 15, 2002, now Pat. No. 7,206,776.

(51) Int. Cl.
G06F 17/30 (2006.01)
(52) U.S. Cl. ................... 707/8; 707/100; 707/3
(58) Field of Classification Search ........ 707/8, 707/9, 201, E17.012, E17.007, 3, 100; 709/223, 709/203; 718/103; 711/100, 141, 147, 151
See application file for complete search history.

(56) References Cited

U.S. PATENT DOCUMENTS

| | | | |
|---|---|---|---|
| 4,823,310 A * | 4/1989 | Grand | 707/8 |
| 5,414,839 A | 5/1995 | Joshi | |
| 5,557,786 A * | 9/1996 | Johnson, Jr. | 707/101 |
| 5,758,356 A * | 5/1998 | Hara et al. | 707/202 |
| 5,761,659 A | 6/1998 | Bertoni | |
| 6,029,190 A | 2/2000 | Oliver | |
| 6,105,057 A | 8/2000 | Kuftedjian et al. | |
| 6,144,983 A * | 11/2000 | Klots et al. | 718/104 |
| 6,480,918 B1 | 11/2002 | McKenney et al. | |
| 2002/0078119 A1* | 6/2002 | Brenner et al. | 709/102 |

* cited by examiner

*Primary Examiner*—Greta L Robinson
(74) *Attorney, Agent, or Firm*—Shook, Hardy & Bacon L.L.P.

(57) ABSTRACT

A locking arrangement for data structures is provided that prevents deadlocks, but still allows different threads to simultaneously obtain locks on different nodes of a data structure for both read and write operations. The locking system differentiates locks based on a priority hierarchy. The locking system will fail a request to lock one or more resources in a data structure if access to those resources has already been restricted by a conflicting lock of an equal or higher priority. The locking system may also employ preemptable and non-preemptable locks such that, if a preemptable lock with a lower priority has restricted access to resources, then the locking system will preempt the lower priority lock in favor of a conflicting higher priority lock. Alternately, if a non-preemptable lock with a lower priority has restricted access to resources, then the locking system will wait until the lower priority lock is removed before implementing a requested conflicting higher priority lock. This locking arrangement allows high priority operations that require higher performance and efficiency to receive preferential access to a data structure without preventing lower priority operations from accessing the data structure, while preventing deadlocks between different operations.

27 Claims, 3 Drawing Sheets

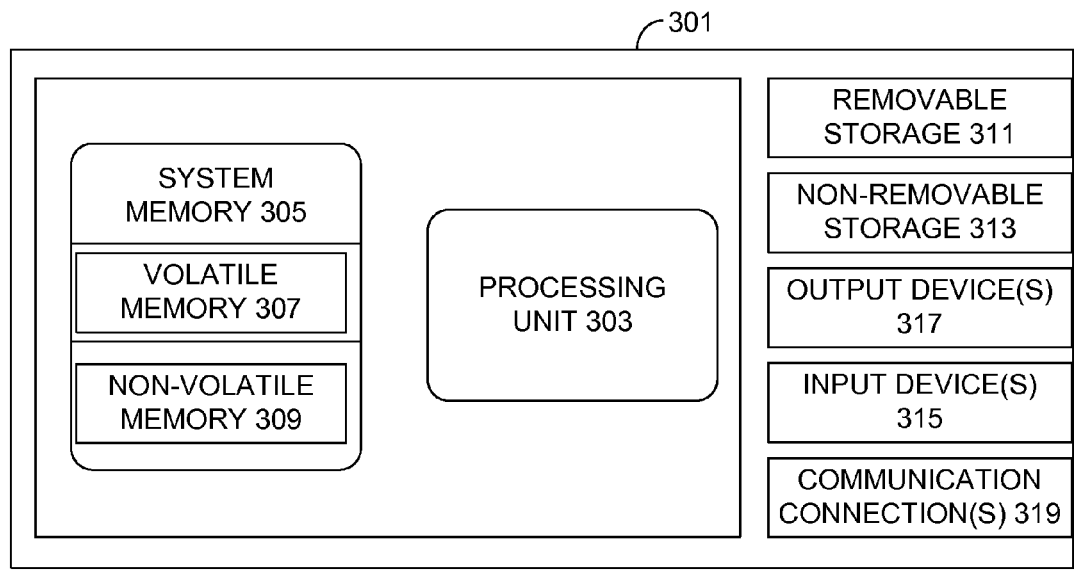
FIGURE 3
FIGURE 4
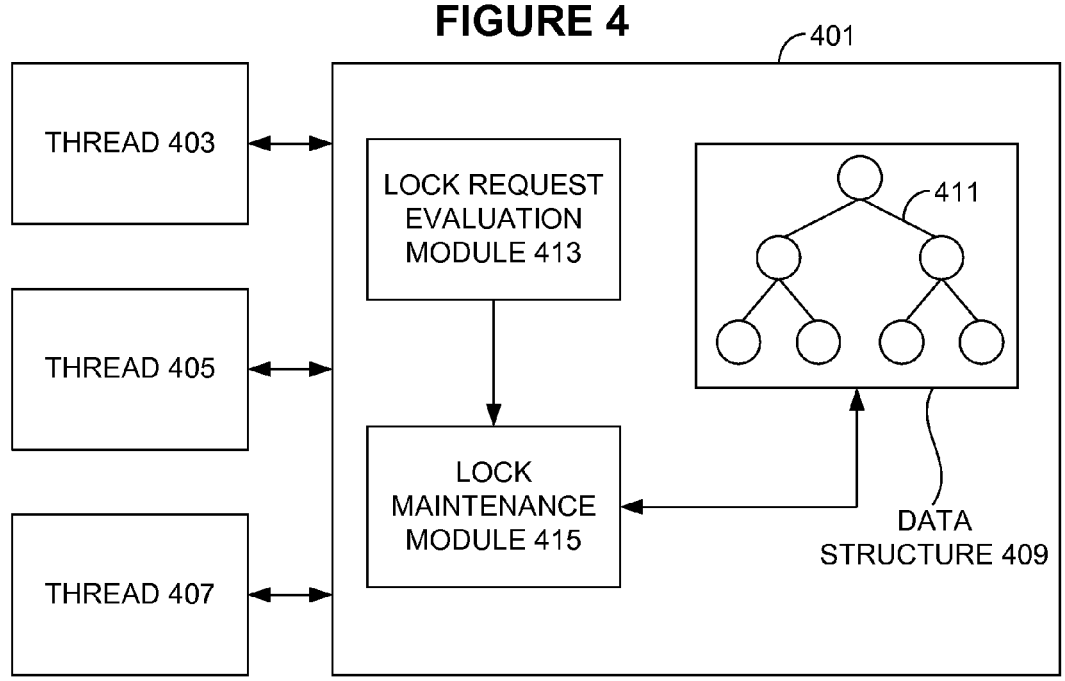

PRIORITY DIFFERENTIATED SUBTREE LOCKING

RELATED APPLICATIONS

This application claims priority under 35 U.S.C. §120 to U.S. patent application Ser. No. 10/222,953, now U.S. Pat No. 7,206,776, filed on Aug. 15, 2002, entitled "Priority Differentiated Subtree Locking," and naming Zoltan Szilagyi et al. as inventors, which application is incorporated entirely herein by reference.

FIELD OF THE INVENTION

Aspects of the present invention are directed to a locking mechanism for locking resources in a data structure, such as a tree data structure. More particularly, aspects of the present invention are directed to a locking technique that differentiates locks based on their priority, in order to avoid deadlocks.

BACKGROUND OF THE INVENTION

Computers arrange data into organized structures, so that the data can be easily located and accessed. One type of commonly-used data structure is the tree structure. With this structure, related pieces of data form individual nodes in the tree. Each node (except for the root node) will have only a single parent node, but may have a plurality of sibling nodes and a plurality of child nodes. Conventionally, a node A is referred to as a descendant of node B if node A's parent is node B, or if node A's parent is a descendant of node B. Similarly, node A is referred to as an ancestor of node B if node B is a descendant of node A.

FIG. 1 graphically illustrates how a tree structure can be used to organize information.

More particularly, this figure illustrates how a tree structure can be used to organize data relating to electronic ink, so that the ink can be manipulated by a user or recognized by a recognition function of an application. Electronic ink may be made up of strokes, with each stroke corresponding to, for example, movement of a pointing device. Each stroke includes information defining the properties of the stroke, such as the data points making up the stroke, a directional vector of the stroke, a color of the stroke, and a thickness at which the stroke is to be rendered on a display.

While strokes can be individually manipulated, it generally is more efficient to first organize strokes before manipulating them. Thus, a parser may be used to establish relationships between individual strokes, and then organize the strokes into larger units for editing or handwriting recognition. For example, a parser may be used to associate groups of related strokes together into units that form a word. Similarly, the parser may associate groups of one or more words together to form a line, and associate groups of one or more lines together to form a block or paragraph. The parser may then associate groups of one or more blocks or paragraphs together to form a single page or a document.

A parser typically will need to analyze electronic ink several times to produce a tree structure that accurately represents the relationships between the electronic ink strokes. Moreover, each time that the electronic ink is edited, the parser will need to update the tree. The parser may therefore need to operate frequently and for prolonged periods of time. To avoid having the parser constantly interfere with active software applications each time that it needs to refine the tree structure, the parser may instead continuously operate in the background with some environments.

FIG. 1 illustrates a tree structure 101 representing the results that might typically be provided by a parser. The tree 101 includes word nodes 103a, 103b, 103c, 103d, 103e, 103f, 103g, and 103h. Each word node 103a, 103b, 103c, 103d, 103e, 103f, 103g, and 103h contains data for the individual strokes that make up a corresponding word W. More particularly, if the parser has determined that a group of strokes make up a word W, then the data for those strokes are contained in (or referenced by) the word nodes 103a, 103b, 103c, 103d, 103e, 103f, 103g, and 103h representing the word W.

If multiple words W are associated by the parser with a single line L, then the word nodes 103a, 103b, 103c, 103d, 103e, 103f, 103g, and 103h for the words W are arranged as children of a line node 105a, 105b, 105c, 105d, and 105e corresponding to the line L. The line nodes 105a, 105b, 105c, 105d, and 105e may include data common to all of its children, such as the color or thickness of the ink making up the words W in the line L. Line nodes 105a, 105b, 105c, 105d, and 105e, corresponding to lines L that the parser has associated into a block B, are then arranged as children of a block node 107a, and 107b corresponding to the block B. The block nodes 107a, and 107b in turn serve as children of a page node 109, which, in the illustrated example, is the root node for the tree 101. Of course, if the parser recognized multiple page boundaries, then the page node 109 might itself be a child of a root node corresponding to the entire document.

A number of different program threads may seek to concurrently access the information provided in the tree 101. For example, if a user is editing the electronic ink with a notetaking application, then the notetaking application will employ a user interface thread that changes the organization of the tree 101 to correspond with the user's edits. Thus, the user interface thread will attempt to execute read or write operations on one more nodes of the tree 101. On the other hand, the notetaking application will also employ a parser thread that may be continually refining the structure of the tree 101 in the background, as noted above. The parser thread may thus also attempt to execute a read or write operation on one or more nodes of the tree 101 at the same time as the user interface thread. Of course, other software applications may also employ threads that could concurrently attempt to access one more nodes of the tree 101 for various reasons.

Moreover, even a single software thread may attempt to sequentially execute one or more read or write operations on one or more nodes of the tree 101. For example, in order to move a word W to a line L, the user interface thread may need to execute a read operation on the line node 105a, 105b, 105c, 105d, or 105e corresponding to the line L, and execute a write operation on the subtree formed by the word node 103a, 103b, 103c, 103d, 103e, 103f, 103g, and 103h corresponding to the word W.

As will be appreciated by those of ordinary skill in the art, it would be very undesirable to allow different threads to concurrently execute conflicting read or write operations on the same node. Accordingly, a thread seeking to access a node of a data structure must first initiate a "lock" on that node, to prevent a conflicting read or write operation of another thread from being executed on that node before its own read or write operation is complete. While the use of locks prevents conflicting read or write operations from concurrently executing on the same node, it creates new problems that can potentially stop the operation of the computer.

For example, referring to FIG. 2, a user interface thread may act to move a word W corresponding to the subtree 201 into the line L represented by the line node 203, as graphically illustrated by the dotted line 205. To complete this task, the user interface thread must request a write lock on the subtree 215. The user interface thread would then also request a write lock on the subtree 207 (that is, the subtree that includes the line node 203). Similarly, the parser thread may act to move the word W corresponding to the subtree 209 into the line L represented by the line node 211, as graphically illustrated by the dotted line 213. In order to complete its task, the parser thread would request a write lock on the subtree 207, and request another write lock on the subtree 215 (that is, the subtree that includes the line node 211).

A problem arises if, for example, the user interface thread obtains a write lock on the subtree 215, but cannot obtain a write lock on the subtree 207 before the parser thread obtains a write lock on the subtree 207. In this situation, the user interface thread will wait for access to the subtree 207 until the parser thread's lock on the subtree 207 is lifted. The parser thread, however, will maintain its write lock on the subtree 207 until it can acquire a write lock on the subtree 215. Because the user interface thread will maintain its lock on the subtree 215 until it can also obtain a lock on the subtree 207, both the user interface thread and the parser thread will reach a deadlock. That is, neither the user interface thread nor the parser thread will be able to complete its task until the other finishes. This situation will effectively stop the operation of both the user thread and the parser thread, and may even impact the operation of other software applications being run by the computer.

One solution to this problem is to allow a single software thread to obtain a lock on the entire data structure. Thus, the user interface thread would be able to obtain a lock on the entire tree 101. The user interface thread could then execute read and write operations as necessary, without interference from other threads. While this solution avoids the problem of deadlocks between different threads, it reduces the performance of other operations requiring access to the data structure. That is, allowing only one thread to use the data structure at any given time unnecessarily delays the operation of other threads that need the information in the data structure. For example, if the parser thread obtains a lock to the entire tree 101 in order to access the subtree 201, then the user interface thread may not simultaneously access the subtree 217, even though accessing the subtree 217 would not interfere with the parser thread's access to the subtree 201. Instead, the user interface thread must first wait for the parser thread to release the lock on the entire tree 101 before it can access the subtree 217, which may substantially delay the operation of the user interface thread.

Another solution to avoid deadlock is to allow a thread executing a write operation to obtain a lock on the entire data structure, while permitting different threads executing read operations to obtain concurrent locks. With this arrangement, a thread attempting to execute a write operation must either wait until all currently executing read operations are completed, or preempt (that is, prematurely end) the executing read operations. Thus, this solution also unnecessarily reduces the performance of operations requiring access to the data structure.

In addition to avoiding unnecessary performance reduction, it may actually be desirable to allow multiple threads to concurrently execute both read and write operations on a data structure. For example, as noted above, it may be useful to have the parser thread invisibly operate as a background process, even while the user is employing the user interface thread to manipulate the electronic ink. If the parser thread cannot execute both read and write operations on the tree 101 concurrently with, for example, the user interface thread, then the parser thread may noticeably prevent or delay the user interface thread from executing write operations.

It thus would be desirable to have a locking system that prevents deadlocks from occurring between different threads, but which does not unnecessarily reduce the performance of those threads. More particularly, it would be desirable to have a locking system for a data structure that allows different threads to concurrently obtain locks on different nodes of the data structure for both read and write operations.

SUMMARY OF THE INVENTION

Advantageously, various aspects of the invention provide a locking arrangement for data structures that prevent deadlocks, but which still allows different threads to simultaneously obtain locks on different nodes of a data structure for both read and write operations. The locking system according to the invention differentiates locks based on a priority hierarchy. The locking system will fail a request to lock one or more resources in a data structure if those resources have already been locked with a non-preemptable, conflicting lock of an equal or higher priority.

More particularly, if a preemptable lock with a lower priority has locked the resources, then the locking system will preempt the lower priority lock in favor of a conflicting higher priority lock. Alternately, if a non-preemptable lock with a lower priority has locked the resources, then the locking system will wait until the lower priority lock is removed before implementing a requested conflicting higher priority lock. Thus, high priority threads that require higher performance and efficiency, such as user interface threads, may receive preferential access to a data structure without preventing lower priority threads, such as a parser thread operating as a background process, from accessing the data structure. In addition, the locking technique still prevents deadlocks from occurring between different threads.

These and other features and aspects of the invention will be apparent upon consideration of the following detailed description.

BRIEF DESCRIPTION OF THE DRAWINGS

FIG. 3 shows a schematic diagram of a general-purpose digital computing environment that can be used to implement various aspects of the invention.

FIG. 4 shows a locking system for providing access to a data structure according to an embodiment of the invention.

DETAILED DESCRIPTION OF PREFERRED EMBODIMENTS

Introduction

Figure 1:
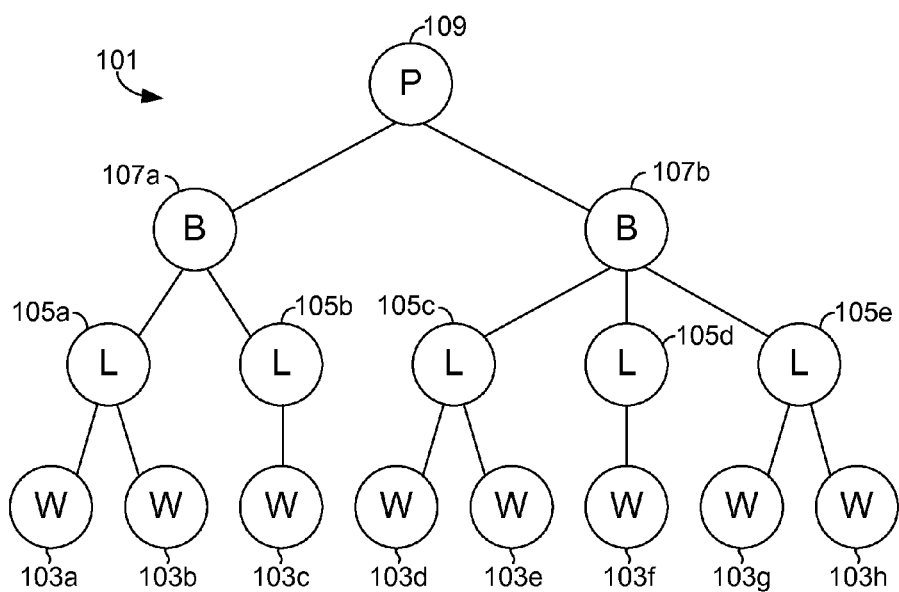
FIGS. 1 and 2 show a schematic diagram of a tree data structure for organizing data relating to an electronic ink document.
Figure 2:
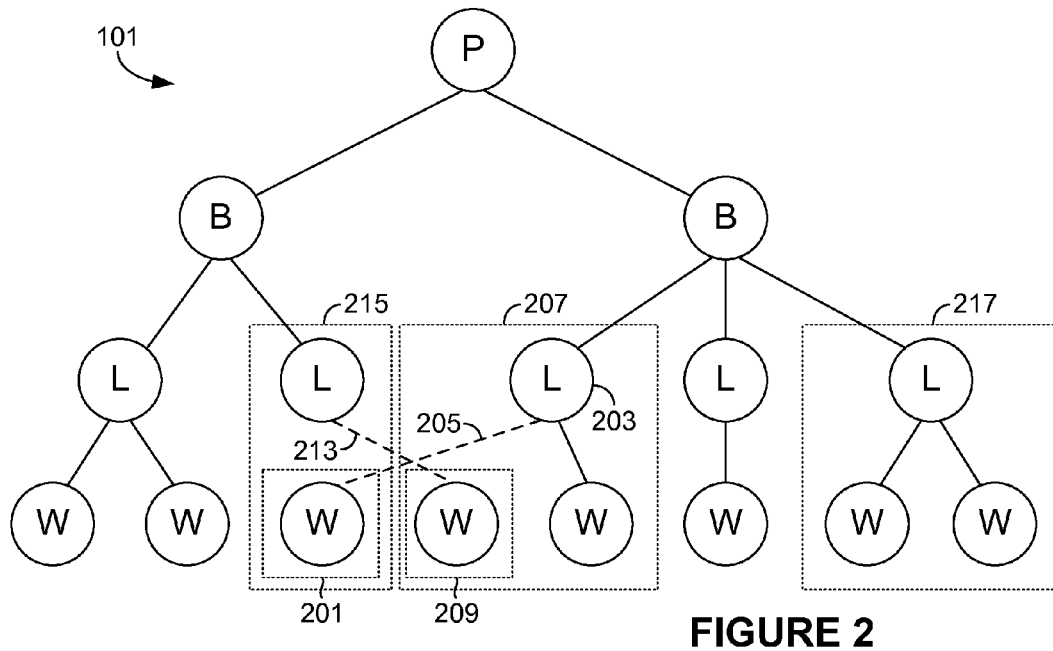

A locking system according to the invention differentiates locks based on a priority hierarchy. Some embodiments of the invention may also distinguish locks for two types of operations on a data structure: a write operation and a read operation. A lock for a write operation (sometimes referred to as a "write lock") by one thread will prevent any other operation by another thread from obtaining a lock on the locked up resources. A lock for a read operation (sometimes referred to as a "read lock") by one thread will then prevent a write lock from being obtained on the locked up resources by another thread.

Thus, two concurrent write locks from different threads to the same resources will conflict with each other, as the modification of the resources by the write operation of one thread will affect the results produced by the write operation of the other thread.

Likewise, a concurrent write lock and a read lock from different threads on the same resources will conflict with each other for the same reason.

Two concurrent read locks, even to the same resources and from different threads, typically will not conflict. That is, because the execution of one read operation will usually not interfere with the results obtained by another read operation, then a locking system may classify all concurrent read locks, regardless of their source, as non-conflicting in order to optimize access to the data structure. If, however, a thread does employ read operations that may interfere with the read operations of another thread, then two concurrent read locks from different threads to the same resources may also be considered conflicting locks. Alternately, a locking system may forego efficiencies obtained by distinguishing read locks from write locks, and simply treat all locks as conflicting.

In addition to locking the resources specified in a lock request, a lock may also restrict access in some way to other resources. For example, with a tree data structure, operations on a given node may advantageously be applied to all of that node's descendants. This frees a thread from having to obtain a separate lock each time that it accessed a different node in a subtree. Moreover, this facilitates consistently applying an operation to an entire subtree. Similarly, an operation on a node should also be respected on any of the nodes in the chain of parents leading from a locked node to the root of the entire tree. For example, if one thread executes a write operation on a child node while another thread executes a read operation on a parent node, then the results of the read operation may be invalid.

Thus, with some embodiments of the invention, a lock on a node will also prevent a conflicting lock from being obtained on both ancestors of that node and descendants of that node. More particularly, for some embodiments of the invention, a lock on a specified node will also lock all of its descendants (that is, the subtree of nodes defined by taking the specified node as the root node), and prevent conflicting locks from being obtained on the ancestors of the specified node. With other embodiments of the invention, however, a lock on a specified node may simply prevent conflicting locks from being obtained on the ancestors or descendants of the specified node.

By differentiating locks according to priority, the locking system of the invention will prevent a request for a lock from waiting for resources that are already locked up by a lock with an equal or higher priority. This allows different threads to concurrently access different portions of a data structure without causing a deadlock, as will be explained in detail below.

Exemplary Operating Environment

As will be appreciated by those of ordinary skill in the art, a locking technique according to the invention may be implemented using software. That is, a locking system according to the invention may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Because the invention may be implemented using software, it may be helpful for a better understanding of the invention to briefly discuss the components and operation of a typical programmable computer on which various embodiments of the invention may be employed. FIG. 3 illustrates an example of a computing device 301 that provides a suitable operating environment in which various embodiments of the invention may be implemented. This operating environment is only one example of a suitable operating environment, however, and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing device 301 typically includes at least some form of computer readable media. Computer readable media can be any available media that can be accessed by the computing device 301. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the operating environment 301.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 3, in its most basic configuration the computing device 301 typically includes a processing unit 303 and system memory 305. Depending on the exact configuration and type of computing device 301, the system memory 305 may include volatile memory 307 (such as RAM), non-volatile memory 309 (such as ROM, flash memory, etc.), or some combination of the two memory types. Additionally, device 301 may also have mass storage devices, such as a removable storage device 311, a non-removable storage device 313, or some combination of two storage device types. The mass storage devices can be any device that can retrieve stored information, such as magnetic or optical disks or tape, punched media, or holographic storage. As will be appreciated by those of ordinary skill in the art, the system memory 305 and mass storage devices 311 and 313 are examples of computer storage media.

The device 301 will typically have one or more input devices 315 as well, such as a keyboard, microphone, scanner or pointing device, for receiving input from a user. The device 301 will typically also have one or more output devices 317 for outputting data to a user, such as a display, a speaker, printer or a tactile feedback device. Other components of the device 301 may include communication connections 319 to other devices, computers, networks, servers, etc. using either wired or wireless media. As will be appreciated by those of ordinary skill in the art, the communication connections 319 are examples of communication media. All of these devices and connections are well know in the art and thus will not be discussed at length here.

A Data Structure System

FIG. 4 illustrates a data structure system 401 according to one embodiment of the invention. As shown in this figure, the data structure system 401 communicates with one or more threads 403-407. More particularly, the threads 403-407 request access to information resources maintained by the data structure system 401. In the illustrated embodiment, each of the threads 403-407 is generated by the same software application, but two or more of the threads 403-407 may alternately be generated by different software applications.

The data structure module 409 maintains information in the data structure 411. The data may be any type of information such as, for example, data relating to an electronic ink document. It should be noted that, while FIG. 3 schematically illustrates the data structure 411 as a tree structure, the data structure module 409 may also maintain data in an alternate structure of any desired typed or configuration. The data may physically be stored in the system memory 305, the removable storage 311, the non-removable storage 313 or a combination thereof using, for example, any suitable database software application.

The data structure system 401 also includes a lock request evaluation module 413. The lock request evaluation module 413 receives requests to access one or more resources of the data structure 405 from the threads 403-407. Typically, a request to access resources will identify the node (or nodes) for which access is requested (sometimes referred to hereafter as the "requested node"), and the type of access requested (that is, whether the thread will access the requested node with a read operation or a write operation). The access request will also include a request to lock the requested node, along with a priority for the requested lock. In addition, the access request may specify whether the requested lock will be a preemptable lock or a non-preemptable lock.

In response to receiving a lock request, the lock request evaluation module 413 determines whether the lock request will succeed or fail. If the lock request evaluation module 413 decides to approve a requested lock, it then passes the lock request to the lock maintenance module 415. The lock maintenance module 415 tracks existing locks. Thus, when the requested node becomes available, the lock maintenance module 415 will initiate the requested lock so that the thread can obtain the specified access to the requested node. The lock maintenance module 415 will then keep track of the new lock as well.

Operation of the Data Structure System

Figure 5:
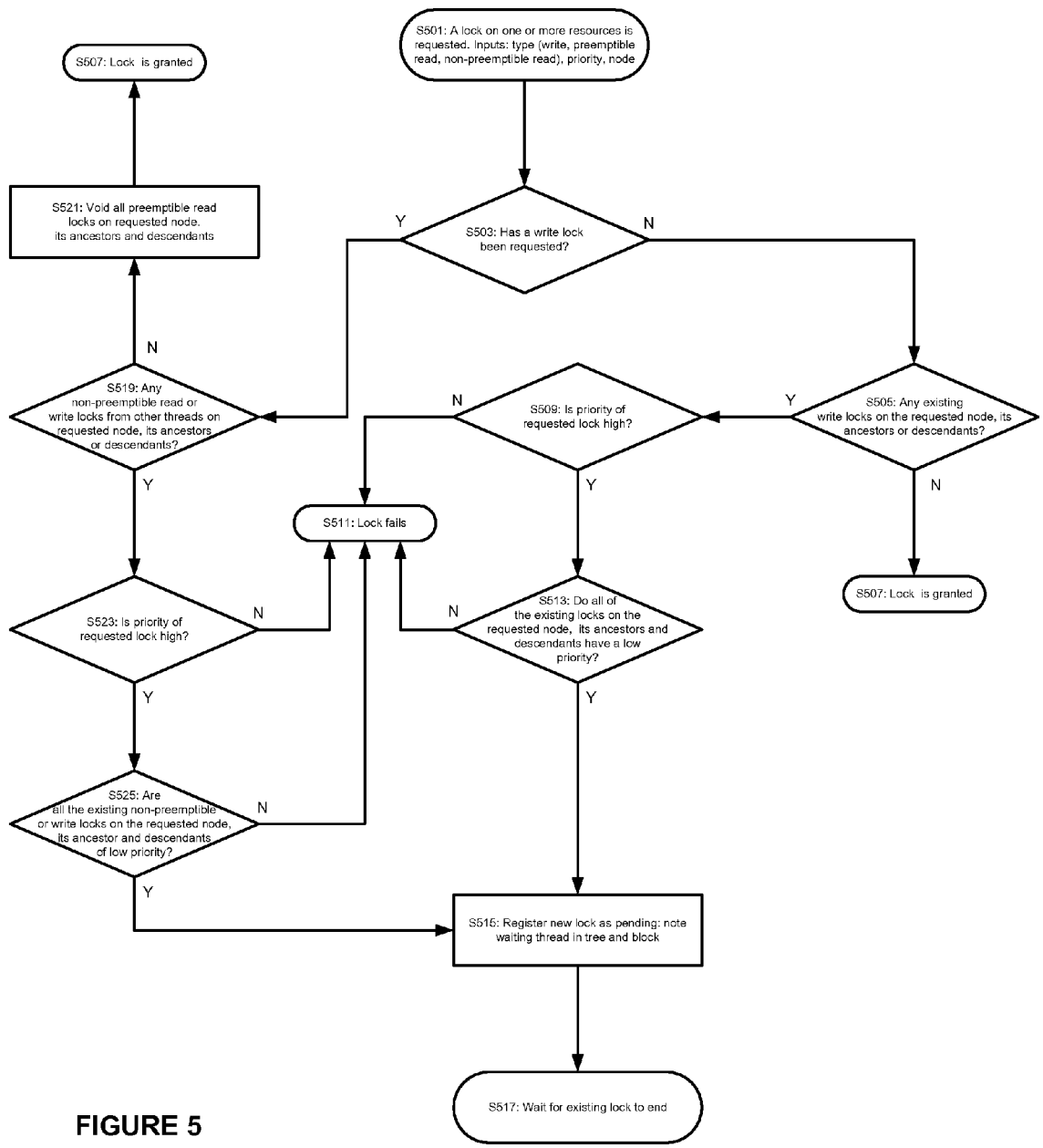
FIG. 5 illustrates a flowchart showing a process for implementing a locking technique according to an embodiment of the invention.

The operation of the lock request evaluation module 413 and the lock maintenance module 415 will now be discussed in more detail with reference to the flowchart illustrated in FIG. 5. In step 501, a thread 403, 405 or 407 submits a request to access one or more resources (for example, to access to a subtree) in the data structure 409. The access request identifies the resources for which access is requested, and the type of access requested. That is, the access request will specify whether the access is to execute a read operation or a write operation. It will also request a lock on the root node of the subtree, along with a priority for the lock.

Upon receiving a lock request, the lock request evaluation module 413 first determines if the requested lock is a write lock. If the requested lock is not a write lock (that is, if the requested lock is a read lock), then in step 505 the lock request evaluation module 413 determines if access to the requested node has been restricted by a conflicting lock. That is, the lock request evaluation module 413 determines if there is an existing write lock on the requested node. The lock request evaluation module 413 also determines if there are any conflicting write locks on any of the ancestors or descendants of the requested node that would prevent a write lock from being obtained on the requested node. As previously noted, a write operation on a node by one thread may also affect the results of a read or write operation on an ancestor or descendant of that node by another thread. Accordingly, while the ancestors or descendants of the node may not be identified in the read lock request, the lock request evaluation module 413 also determines if a conflicting write lock has already been obtained for these resources. Thus, the lock request evaluation module 413 determines if the requested lock will conflict with an existing lock that would restrict access to any of the requested resources.

If none of the requested node, its ancestors and its descendants have been locked up by a conflicting lock, then the lock request evaluation module 413 immediately approves the requested lock in step 507, and passes the approved lock request onto the lock maintenance module 415. If the requested node, one of its ancestors or one of its descendant has already been locked by a conflicting write lock, however, then the lock request evaluation module 413 determines if the priority of the requested read lock is a high priority in step 509. With the illustrated embodiment of the invention, the lock request evaluation module 413 recognizes only two priorities of locks, high and low. Accordingly, if the priority of the requested read lock is not high, it must be low, and thus equal to or lower than the priority of the conflicting write lock on the requested lock, its ancestor or descendant. As a result, the lock request evaluation module 413 fails the requested lock in step 511.

If, however, the requested read lock has a high priority, then in step 513 the lock request evaluation module 413 checks to confirm that all of the conflicting write locks on the requested node, its ancestors and its descendants are low priority. If one of these conflicting write locks are high priority, then again the requested read lock is equal to this conflicting high priority write lock, and the requested read lock is failed in step 511. If all of the conflicting write locks on the requested node, its ancestors and its descendants are low priority (and thus lower in priority than the requested read lock), then in step 515 the lock request evaluation module 413 will approve the requested read lock. In step 517, the lock request evaluation module 413 passes the requested read lock onto the lock maintenance module 415, which notes that the requested read lock is waiting for the existing conflicting write locks to complete and should be implemented when these locks are completed.

Returning now to step 503, if the lock request evaluation module 413 determines that a thread has requested a write lock (that is, that the requested lock will conflict with any existing lock from another thread), then in step 519 the lock request evaluation module 413 determines if there are any conflicting non-preemptable read locks or write locks that would restrict access to the requested node. That is, the lock request evaluation module 413 determines if there is an existing conflicting lock on the requested node. It also determines if there are any existing, conflicting non-preemptable read locks or write locks on the ancestors or descendants of the requested node. If there are not (that is, if there are no existing locks or if the only existing locks are preemptable), then in step 521 the lock request evaluation module 413 voids any existing preemptable read locks on the requested nodes, its ancestors and its descendants. Then, in step 507, it approves the requested write lock and passes the requested write lock onto the lock maintenance module 415 to be implemented.

If, however, there is one or more conflicting non-preemptable read locks or write locks on a requested node, one of its ancestors or one of its descendants, then in step 523 the lock request evaluation module 413 determines if any of these conflicting locks has a high priority. Again, because the lock request evaluation module 413 in this embodiment only recognizes two priorities, if any of these conflicting locks has a high priority, then the priority of the requested lock must be equal to or lower than the priority of these conflicting locks. Thus, in step 511, the lock request evaluation module 413 fails the requested write lock.

On the other hand, if none of the conflicting locks on the requested node, its ancestors or its descendants has a high priority, then in step 525 the lock request evaluation module 413 determines the priority of the requested write lock. If it is low, then again it must be equal to the priority of the conflicting locks, and is failed in step 511. If, however, the priority of the requested write lock is high, it is greater than the priority of any conflicting lock on the requested node, its ancestors and its descendants, and in step 515 the lock request evaluation module 413 will approve the requested read lock. In step 517, the lock request evaluation module 413 passes the requested read lock onto the lock maintenance module 415 to be implemented when the existing conflicting write locks are completed.

In the illustrated embodiment, the locking system uses only two priorities. It should be noted, however, that other embodiments of the invention may employ a priority hierarchy with any number of desired priorities. As in the embodiment described above, with these alternate embodiments of the invention a requested lock will not wait on a conflicting, non-preemptable lock of equal or higher priority. For example, if the locking system according to the invention employed three priorities, high, medium and low, then a lock request for a medium priority lock would not wait for an existing conflicting lock with a high or medium priority to complete, but would wait for an existing conflicting lock with a low priority to complete. Similarly, a lock request for a high priority lock would not wait for an existing conflicting lock with a high priority to complete, but would wait for an existing conflicting lock with a medium or low priority to complete. Of course, the implementation of still greater numbers of different priorities will be apparent from the foregoing description.

In the foregoing illustrated embodiment, any write lock will preempt a preemptable lock, regardless of the relative priority of the different locks. It should be appreciated, however, that alternate embodiments of the invention may only allow a write lock to preempt a preemptable read lock of lower priority. Also, it should be noted that, to facilitate an understanding of the invention, the invention has been explained above with particular emphasis on prioritizing locks between different threads of a single software application. As will be appreciated by those of ordinary skill in the art from the foregoing description, however, the invention may also be employed to prevent lock conflicts between threads of different software applications. Still further, while the above discussion of the invention distinguishes locks for read operations from locks for write operations, various embodiments of the invention need not make that distinction. Instead, as previously noted, these embodiments of the invention may characterize all locks from different threads as conflicting locks.

Conclusion

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention.

What is claimed is:

1. A hierarchal locking system embodied on one or more computer readable media for accessing resources of a data structure relating to electronic ink strokes, comprising:
   one or more resources that are nodes of a tree structure;
   a parser for analyzing one or more electronic ink strokes to produce the tree structure, wherein the tree structure represents a relationship between the one or more electronic ink strokes, and wherein each node contains data corresponding to the one or more electronic ink strokes;
   high priority locks for locking at least a portion of the nodes, such that
   if a first high priority lock request attempts to lock one or more of the nodes for a write operation when access to the one or more nodes is already restricted by a conflicting second high priority lock, or
   if a first high priority lock request attempts to lock one or more of the nodes for a read operation when access to the one or more nodes is already restricted by a conflicting second high priority lock for a write operation,
   then the first high priority lock request will fail; and
   low priority locks having a low priority for locking at least a portion of the nodes, such that
   if a first low priority lock request attempts to lock one or more of the nodes for a write operation when access to the one or more nodes is already restricted by a conflicting second low priority lock or by a high priority lock, or
   if a first low priority lock request attempts to lock one or more of the nodes for a read operation when access to the one or more nodes is already restricted by a conflicting second low priority lock for a write operation or by a high priority lock for a write operation,
   then the first low priority lock request will fail.

2. The hierarchical locking system recited in claim 1, wherein the nodes form a subtree of the tree structure.

3. The hierarchical locking system recited in claim 1, further comprising:
   medium priority locks having a medium priority for locking at least a portion of the nodes, such that if a first medium priority lock request attempts to lock one or more of the nodes for a write operation when access to the one or more nodes is already restricted by a conflicting high priority lock or a conflicting second medium priority lock, then the first medium priority lock request will fail, and if a first medium priority lock request attempts to lock one or more of the nodes for a read operation when access to the one or more nodes is already restricted by a conflicting high priority lock for a write operation or by a conflicting second medium priority lock for a write operation, then the first medium priority lock request will fail; and wherein if a low priority lock request attempts to lock one or more of the nodes for a read operation when access to the one or more nodes is already restricted by a conflicting medium priority lock for a write operation, then the low priority lock request will fail, and if a low priority lock request attempts to lock one or more of the nodes for a write operation when access to the one or more nodes is already restricted by a conflicting medium priority lock, then the low priority lock request will fail.

4. The hierarchical locking system recited in claim 1, wherein the low priority locks include preemptable low priority locks, such that if a high priority lock request attempts to lock one or more of the nodes when access to the one or more nodes is already restricted by a conflicting preemptable low priority lock, then the high priority lock request will preempt the conflicting preemptable low priority lock.

5. The hierarchical locking system recited in claim 1, wherein the low priority locks include non-preemptable low priority locks, such that if a high priority lock request attempts to lock one or more of the nodes when access to the one or more nodes is already restricted by a conflicting non-preemptable low priority lock, then the high priority lock request will wait until the conflicting non-preemptable low priority lock completes before locking the one or more nodes.

6. The hierarchical locking system recited in claim 1, wherein
a lock for a write operation cannot lock an ancestor of a node that is already locked up.

7. The hierarchical locking system recited in claim 6, wherein the read low priority locks include preemptable low priority locks for read operations, such that if a high priority lock request for a write operation attempts to lock an ancestor of a node that is already locked by a conflicting preemptable low priority lock for a read operation, then the high priority lock request will preempt the conflicting preemptable low priority lock.

8. A computer-implemented method of providing access to data relating to electronic ink strokes, comprising:
parsing, utilizing a first computing process, the data into a tree arrangement, wherein the tree arrangement includes at least a subtree of nodes containing one or more electronic ink strokes;

allowing, utilizing a second computing process, two or more users to concurrently lock and access different subtrees of the tree by requesting a high priority lock or a low priority lock, wherein if a first high priority lock request attempts to lock a subtree when access to the subtree is already restricted by a conflicting second high priority lock for a write operation, or if a first high priority lock request attempts to lock a subtree for a write operation when access to the subtree is already restricted by a conflicting second high priority lock, then the first high priority lock request will fail; and if a first low priority lock request attempts to lock a subtree when access to the subtree is already restricted by a conflicting high priority lock for a write operation or by a conflicting second low priority lock for a write operation, or if a first low priority lock request attempts to lock a subtree for a write operation when access to the subtree is already restricted by a conflicting second low priority lock or by a conflicting high priority lock, then the first low priority lock request will fail, and wherein the first and second computer processes are performed by one or more computing devices.

9. The method recited in claim 8, wherein the two or more users include threads of one or more software programs.

10. The method recited in claim 8, further comprising allowing the two or more users to initiate a preemptable low priority lock, wherein if a high priority lock request for a write operation attempts to lock a subtree when access to the subtree is already restricted by a conflicting preemptable low priority lock, then the high priority lock request will preempt the conflicting preemptable low priority lock.

11. The method recited in claim 8, further comprising allowing the two or more users to initiate a non-preemptable low priority lock, wherein if a high priority lock request for a write operation attempts to lock a subtree when access to the subtree is already restricted by a conflicting non-preemptable low priority lock, then the high priority lock request will wait until the conflicting non-preemptable low priority lock completes before restricting access to the subtree.

12. The method recited in claim 8, wherein a high priority lock for a write operation and a low priority lock for a write operation cannot lock up an ancestor of a node that is already locked.

13. The method recited in claim 12, wherein
if a high priority lock request for a write operation attempts to lock an ancestor of a node that is locked by a conflicting preemptable low priority lock for a read operation, then the high priority lock request will preempt the conflicting preemptable low priority lock.

14. A system embodied on one or more computer readable media for providing access to data relating to electronic ink strokes, comprising:
a data structure containing a plurality of nodes;
a parser for analyzing one or more electronic ink strokes to produce the data structure, wherein the data structure represents a relationship between the one or more electronic ink strokes, and wherein each node contains data corresponding to the one or more electronic ink strokes;
a lock request evaluation module that
receives lock requests to initiate locks on one or more of the plurality of nodes of the data structure,
handles each received lock request according to a priority of the requested lock and a lock status of the one or more of the plurality of nodes; and
a lock maintenance module that initiates locks approved by the lock request evaluation module.

15. The system recited in claim 14, wherein the lock request evaluation module
determines a priority of a requested lock;
determines if the one or more of the plurality of nodes are already locked up by an existing conflicting lock; and if the one or more of the plurality of nodes are already locked up by an existing conflicting lock, determines a priority of the existing conflicting lock, and fails the requested lock if the priority of the requested lock is equal to or lower than the priority of the existing conflicting lock.

16. The system recited in claim 15, wherein, if the priority of the requested lock is higher than the priority of the existing conflicting lock, the lock maintenance module postpones implementing the requested lock until the existing conflicting lock is completed.

17. The system recited in claim 15, wherein the lock request evaluation module determines if the existing conflicting lock is preemptable or non-preemptable, and if the priority of the requested lock is higher than the priority of the existing conflicting lock and the existing conflicting lock is preemptable, the lock maintenance module immediately implements the requested lock; and if the priority of the requested lock is higher than the priority of the existing conflicting lock and the existing conflicting lock is non-preemptable, the lock maintenance module postpones implementing the requested lock until the existing conflicting lock is completed.

18. The system recited in claim 14, wherein the data structure is a tree.

19. The system recited in claim 18, wherein the one or more of the plurality of nodes form a subtree of the tree.

20. One or more computer readable media having computer executable instructions embodied thereon that when executed perform a method of locking resources in a tree structure with data relating to electronic ink strokes, comprising:

parsing one or more electronic ink strokes into a tree structure;

receiving a lock request to lock one or more resources;

determining if access to the one or more resources is already restricted by an existing lock that will conflict with the requested lock, and if access to the one or more resources is not already restricted by an existing lock that will conflict with the requested lock, then approving the requested lock, and if access to the one or more resources is already restricted by an existing lock that will conflict with the requested lock, comparing a priority of the requested lock with a priority of the existing lock, and if the priority of the requested lock is higher than the priority of the existing lock, then approving the requested lock.

21. The one or more computer readable media recited in claim 20, wherein a lock may be a write lock or a read lock.

22. The one or more computer readable media recited in claim 21, wherein a read lock may be a preemptable read lock or a non-preemptable read lock.

23. The one or more computer readable media recited in claim 22, wherein a request for a write lock will conflict with an existing non-preemptable read lock.

24. The one or more computer readable media recited in claim 22, wherein a request for a read lock will conflict with an existing write lock.

25. The one or more computer readable media recited in claim 20, further comprising, if the priority of the requested lock is higher than the priority of the existing lock, implementing the approved lock after the existing lock on the one or more resources is completed.

26. The one or more computer readable media recited in claim 20, wherein the one or more resources are nodes of a tree structure.

27. The one or more computer readable media recited in claim 26, wherein the nodes form a subtree of a tree structure.

* * * * *